US00RE45413E

(19) United States
(12) Reissued Patent
Lund

(10) Patent Number: US RE45,413 E
(45) Date of Reissued Patent: Mar. 17, 2015

(54) MULTI FUEL CO-INJECTION SYSTEM FOR INTERNAL COMBUSTION AND TURBINE ENGINES

(71) Applicant: Exen Holdings, LLC, Escondido, CA (US)

(76) Inventor: Morten A. Lund, Escondido, CA (US)

(21) Appl. No.: 13/732,563

(22) Filed: Jan. 2, 2013

Related U.S. Patent Documents

Reissue of:
(64) Patent No.: 7,861,696
Issued: Jan. 4, 2011
Appl. No.: 12/085,284
PCT Filed: Nov. 24, 2006
PCT No.: PCT/US2006/045399
§ 371 (c)(1),
(2), (4) Date: May 20, 2008
PCT Pub. No.: WO2007/062217
PCT Pub. Date: May 31, 2007

U.S. Applications:
(60) Provisional application No. 60/739,594, filed on Nov. 26, 2005.

(51) Int. Cl.
*F02D 19/06* (2006.01)

(52) U.S. Cl.
USPC ..... 123/525; 123/575

(58) Field of Classification Search
USPC ..... 123/1 A, 27 GE, 525, 526, 456, 575–577
See application file for complete search history.

(56) References Cited

U.S. PATENT DOCUMENTS

| | | | | |
|---|---|---|---|---|
| 2,758,579 | A | 8/1956 | Pinotti | |
| 2,865,345 | A | 12/1958 | Hilton | |
| 4,373,493 | A | 2/1983 | Welsh | |
| 4,388,893 | A * | 6/1983 | Apfel | 123/25 J |
| 4,413,604 | A * | 11/1983 | Tune | 123/515 |
| 4,471,744 | A * | 9/1984 | Holtz | 123/514 |
| 4,742,801 | A | 5/1988 | Kelgard | |
| 4,953,516 | A | 9/1990 | Van Der Weide et al. | |
| 5,024,195 | A | 6/1991 | Pien | |
| 5,207,204 | A | 5/1993 | Kawachi et al. | |
| 5,237,978 | A * | 8/1993 | Bailey | 123/515 |
| 5,245,953 | A * | 9/1993 | Shimada et al. | 123/25 E |
| 5,291,869 | A | 3/1994 | Bennett | |
| 5,560,344 | A * | 10/1996 | Chan | 123/515 |
| 5,679,236 | A | 10/1997 | Poschl | |
| 5,765,537 | A * | 6/1998 | Coleman et al. | 123/514 |
| 5,771,848 | A * | 6/1998 | Bastenhof | 123/25 C |
| 5,816,224 | A | 10/1998 | Welsh et al. | |
| 5,832,900 | A * | 11/1998 | Lorraine | 123/456 |
| 6,067,969 | A | 5/2000 | Kemmler et al. | |
| 6,205,981 | B1 * | 3/2001 | Lorraine | 123/514 |
| 6,213,104 | B1 | 4/2001 | Ishikiriyama et al. | |
| 6,235,067 | B1 | 5/2001 | Ahern et al. | |
| 6,427,660 | B1 | 8/2002 | Yang | |
| 6,513,505 | B2 | 2/2003 | Watanabe et al. | |
| 6,571,748 | B2 | 6/2003 | Holder et al. | |
| 6,584,780 | B2 | 7/2003 | Hibino et al. | |
| 6,622,664 | B2 | 9/2003 | Holder et al. | |
| 6,656,236 | B1 * | 12/2003 | Coleman et al. | 44/301 |
| 6,761,325 | B2 | 7/2004 | Baker et al. | |
| 6,845,608 | B2 | 1/2005 | Klenk et al. | |

(Continued)

*Primary Examiner* — Erick Solis
(74) *Attorney, Agent, or Firm* — The Noblitt Group, PLLC

(57) ABSTRACT

An improved multi-fuel supply and co-injection system and method for powering internal combustion and turbine engines, whereby various combinations of fuels, both liquid and gaseous, may be mixed together and fed into the system, under the real-time control of a microprocessor responding to a variety of sensors and acting on a variety of control devices, all working together in a manner designed to enhance the utilization of the thermal content of the various fuels, and in particular to enhance the combustion efficiency and increase the power output while decreasing the consumption of fuel, calculated both by quantity and by cost and whereby the liquid fuel lubricates the moving parts of the injection system.

21 Claims, 4 Drawing Sheets

(56) References Cited

U.S. PATENT DOCUMENTS

| | | | | |
|---|---|---|---|---|
| 7,019,626 | B1 | 3/2006 | Funk | |
| 7,028,672 | B2 | 4/2006 | Glenz et al. | |
| 7,055,511 | B2 | 6/2006 | Glenz et al. | |
| 7,249,574 | B2 * | 7/2007 | Verstallen | 123/25 A |
| 7,640,913 | B2 * | 1/2010 | Blumberg et al. | 123/304 |
| 2002/0062822 | A1 | 5/2002 | Watanabe et al. | |
| 2002/0152999 | A1 | 10/2002 | Holder et al. | |
| 2004/0089262 | A1 | 5/2004 | Tasmura et al. | |
| 2007/0169749 | A1 | 7/2007 | Hoenig et al. | |
| 2008/0022965 | A1 | 1/2008 | Bysveen et al. | |
| 2008/0029066 | A1 | 2/2008 | Futonagane et al. | |
| 2008/0245318 | A1 | 10/2008 | Kuroki et al. | |

* cited by examiner

MULTI FUEL CO-INJECTION SYSTEM FOR INTERNAL COMBUSTION AND TURBINE ENGINES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims priority to and is entitled to the filing date of U.S. Provisional application Ser. No. 60/739,594 filed Nov. 26, 2005, and entitled "Gaseous Enhanced Fuel System for Combustion Engines". The content of the aforementioned application is incorporated herein by reference.

INCORPORATION BY REFERENCE

Applicant hereby incorporates herein by reference any and all U.S. patents and U.S. patent applications cited or referred to in this application.

TECHNICAL FIELD

Aspects of this invention relate generally to fuel injection systems, and more particularly to an apparatus and method for multi-fuel co-injection systems for internal combustion and turbine engines.

BACKGROUND ART

The following art defines the present state of this field:

Great Britain Patent Application Publication No. GB2413824 to Bysveen, et al. describes a diesel-cycle internal combustion engine which operates using a liquified hydrocarbon gas fuel containing an ignition improver, eg a cetane improver. The gas may be supplied to the combustion chambers using a common rail fuel supply system. The fuel and method of operating the diesel-cycle engine can be used in a range of applications such as, for example, road or marine vehicles or in static applications such as electrical generators. The fuel and the ignition improver may both be supplied to the engine in liquid form either pre-mixed in bulk (FIG. 1); kept in separate tanks 202, 204, pressurised by separate pumps 207, 208 and mixed in the injector 206; or mixed before reaching a common rail (301, FIG. 3A) or within a common rail (305, FIG. 3B). Alternatively, eg with methane or natural gas, the fuel may be pressurised rather than liquefied and the ignition improver is suspended as a mist in the gas. The fuel may be eg methane, ethane, propane, butane or natural gas. The ignition improver may be diesel fuel, any mixture of alkanes and alkenes, a mono-ether, a di-ether, DME (diethyl ether), GTL (Gas-to-Liquid), alkyl and/or aryl nitrates.

U.S. Pat. No. 7,040,281 to Crawford, et al. describes a method of operating a gaseous-fueled internal combustion engine comprises selecting one of at least two predetermined operating modes as a function of engine load and engine speed. A first operating mode is selected when said engine is commanded to operate within a first region corresponding to a low load and low speed range, and a second operating mode is selected when said engine is commanded to operate within a second region distinct from said first region and corresponding to at least one of a greater load and a greater speed range compared to said first region. In the first operating mode, the gaseous fuel is introduced in a single injection event with the injection valve commanded to open with a constant amplitude A1. In the second operating mode, the gaseous fuel is introduced in a single injection event and the injection valve is commanded to begin with a constant amplitude A2 for a predetermined time and then to open to an amplitude A3, wherein amplitude A3 is greater than amplitude A2.

U.S. Pat. No. 7,019,626 to Funk describes systems, methods and apparatus' of converting an engine into a multi-fuel engine are provided. One embodiment reduces particulate emissions and reduces the amount of combusted gasoline or diesel fuel by replacing some of the fuel with a second fuel, such as natural gas, propane, or hydrogen. One feature of the present invention includes a control unit for metering the second fuel. Another feature of the present invention includes an indicator that indicates how much second fuel is being combusted relative to the diesel or gasoline. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

Japanese Patent Application Publication No. EP1211407 to Watanabe, et al. describes injectors 2 are connected to a common rail 4 via respective dispensing conduits 3. A mixture of a liquid fuel fed from a liquid fuel tank 2 and an additional fluid fed from an additional fluid tank 9 is formed, and is fed to the common rail 4. The additional fluid contained in the mixture is turned to its supercritical state, and the mixture is injected from the injectors 2 to the engine. The inlets of the dispensing conduits 3 are positioned, with respect to the common rail 4, to open out into a liquid fuel layer which will be formed in the common rail 4 when a separation of the mixture occurs.

German Patent Application Publication No. DE19609799 to Danckert, et al. describes an engine can be fed selectively with a first fuel or with a second fuel in the form of clean fuel or an emulsion of fuel and a further material insoluble in relation to the fuel. The fuel is fed in a circuit through the common pre-accumulator (6). The fuel injection equipments (1) have a through passage for the fuel fed from the common pre-accumulator. The part of the fuel not injected from the injection nozzles into the engine is fed back via a return flow conduit (8) to the common pre-accumulator.

U.S. Pat. No. 5,125,367 to Ulrich, et al. describes a method and apparatus for producing a water-in-fuel-emulsion and emulsifier-free water-in-fuel-emulsion. The apparatus for generating a fuel water emulsion for the operation of an injection pump, particularly that of a diesel motor, comprising a rotationally symmetric vortex chamber (1) with a tangential inlet and a tapering axial outlet. In order to generate a fine homogeneous emulsion in colloidal state, having a size of the suspended water droplets of 1000 nm or less, the axial end portion of the vortex chamber (1) facing away from the outlet is surrounded by a ring channel (7) running coaxially to the vortex chamber (1), the ring channel (7) being connected to the vortex chamber (1) via inlet slots (9) which are tangentially aligned to it and in which a fuel inlet channel (8) tangentially ends. An electromagnetically controlled water injection nozzle (10) leads into the end portion of the vortex chamber (1) at the inlet side thereof. The outlet (2) of the vortex chamber (1) opens via an enlargement (3) into a suction chamber (4) of a radial wheel (5) which is arranged in a pump chamber (12) having an outlet channel (13) in the area of the circumference of the radial wheel (5) to which a forward conduit leading to the injection pump and a recirculation conduit leading to an emulsion inlet channel (15) are connectable which also ends tangentially into the ring channel (7). An intake channel (16), to which a return conduit coming from the injection pump is connectable, leads into the suction chamber (4) of the radial wheel (5).

U.S. Pat. No. 6,866,756 to Klein describes an electrolyzer for electrolyzing water into a gaseous mixture comprising hydrogen gas and oxygen gas. The electrolyzer is adapted to deliver this gaseous mixture to the fuel system of an internal combustion engine. The electrolyzer of the present invention comprises one or more supplemental electrode at least partially immersed in an aqueous electrolyte solution interposed between two principle electrodes. The gaseous mixture is generated by applying an electrical potential between the two principal electrodes. The electrolyzer farther includes a gas reservoir region for collecting the generated gaseous mixture. The present invention further discloses a method of utilizing the electrolyzer in conjunction with the fuel system of an internal combustion engine to improve the efficiency of said internal combustion engine.

U.S. patent application Publication Ser. No. 10/277,841 to Klein describes an arrangement and method is disclosed for improving the fuel economy of an internal combustion engine of the type having a carburetor for mixing a fuel with air, in which the air is saturated with a mixture of ether, alcohol and water.

U.S. Pat. No. 4,412,512 to Cotten describes a fuel supply system is disclosed in which oil and water are mixed and delivered under pressure to a nozzle or other atomizing means at which combustion is to occur. The mixture of oil and water is delivered to the atomizing means along conduit means and those conduit means include means to produce agitation of the oil and water so that an intimate mixture of oil and water is delivered to the atomizing means. Complete emulsification occurs at the atomizing means to promote combustion.

More generally, in the prior art, typically a single fuel is held in a tank and fed into the engine through a carburetor or injection system. In a carburetor system liquid fuel is mixed with the air in the carburetor, and the fuel-air mixture is admitted to the combustion chambers through an intake manifold and compressed in the combustion chamber. In an injector system the air is fed into the combustion chambers and the fuel or fuels injected directly into the combustion chamber and mixed with the compressed air. Various embodiments have been run on gasoline, diesel, kerosene, propane, hydrogen, natural gas, generated methane, or other flammable substances. In some embodiments a gaseous enhancement, such as hydrogen, water vapor or nitrous oxide is added to the air inflow stream to increase the power extracted from the liquid fuel. Some engines are modified to run entirely on a gaseous fuel instead of a liquid fuel.

DISCLOSURE OF INVENTION

Aspects of the present invention generally relate to an improved multi-fuel supply and co-injection system for powering internal combustion and turbine engines, whereby various combinations of fuels, both liquid and gaseous, may be mixed together and fed into the system, under the real-time control of a microprocessor responding to a variety of sensors and acting on a variety of control devices, all working together in a manner designed to enhance the utilization of the thermal content of the various fuels, and in particular to enhance the combustion efficiency and increase the power output while decreasing the consumption of fuel, calculated both by quantity and by cost. One consideration in the configuration of the system is that the thermal response of some types of fuel may be significantly enhanced by the presence of other fuels consisting of a different chemical composition. For example, the combustion characteristics of vegetable oil may be considerably enhanced by the presence of an excess of hydrogen over that contained within the vegetable oil itself, and additional oxygen fed into the system may be expected to enhance the combustion characteristics of all the fuels involved.

Accordingly, further aspects of the invention generally relate to systems and methods of introducing combustible materials into the combustion chambers of an internal combustion or turbine engine to produce power by burning of the fuel mixed with air under pressure. The purpose of the present invention is to provide for a system whereby a variety of fuels, both gaseous and liquid, may be mixed together and the combination introduced into the engine under pressure in a manner and proportion that enhances the total burn reaction above what could be obtained from any of the single fuels in isolation and that makes possible the use of less expensive fuel sources without impeding the function of the engine or reducing the power which it can produce.

Another feature of the invention is to use the first fuel such as diesel, vegetable oil or motor oil etc. to act as a lubricating component for the moving parts in the injection system.

In still further aspects of the invention, for one example, used vegetable oil may be mixed with gaseous hydrogen and injected into the combustion chambers under high pressure to produce a combustion equivalent to premium diesel fuel at a fraction of the cost. In another example, propane may be reduced to a liquid under pressure and mixed with petroleum diesel fuel in a proportion that maximizes the combustion characteristics of both and results in substantially increased fuel economy. In a more complex embodiment several different types of fuel may be tanked separately and metered into the system at varying rates in order to meet the changing demands of the engine for power and torque under varying loads and speeds in the most efficient manner.

Other features and advantages of aspects of the present invention will become apparent from the following more detailed description, taken in conjunction with the accompanying drawings, which illustrate, by way of example, the principles of aspects of the invention.

BRIEF DESCRIPTION OF DRAWINGS

The accompanying drawings illustrate aspects of the present invention. In such drawings.

MODES FOR CARRYING OUT THE INVENTION

Figure 1:
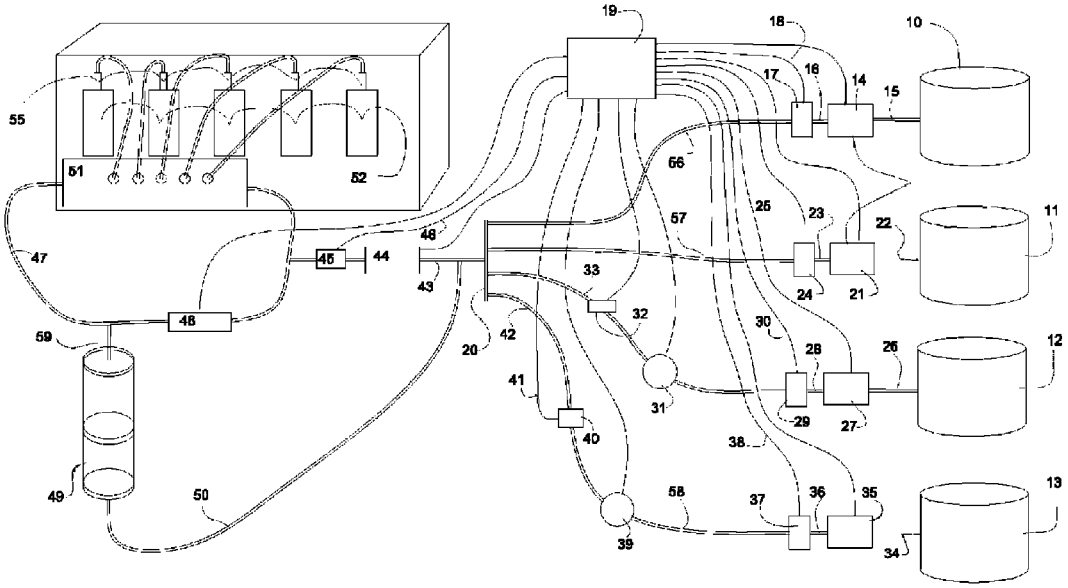
FIG. 1 is a schematic view of an exemplary embodiment of the present invention such as might be used in a large stationary installation with a variety of different fuels available from time to time.

The above described drawing figures illustrate aspects of the invention in at least one of its exemplary embodiments, which are further defined in detail in the following modes.

The system is generally comprised of a multiplicity of tanks containing a variety of types of fuel which are delivered to the combustion chambers of the engine by means of various sensors, pumps, and control devices so constructed and arranged as to combine the different fuels at carefully metered rates into a circulating homogenizing common stream—all under the control of a microprocessor and computer.

When the system is in operation, a throttle mechanism responds directly to an action by the operator by increasing the amount of the pre-mixed fuel from a fuel circulation system into a common rail injector system or other device designed to introduce fuel into the engine's combustion chambers. Some of this pre-mixed fuel is contained within an accumulator in the fuel circulation system and is held under pressure ready for instant use. Sensors monitor the pressure of the fuel in the accumulator and forward the data to the microprocessor, which activates the various pumps and control valves to maintain the supply of fuel in the circulation system at optimum level with the appropriate mix of the various fuel types. The relative balance of fuel types in the fuel mixture may be adjusted during the operation of the engine to compensate for different operating requirements. For example, an engine operating at reduced torque in a steady rpm configuration, such as driving an electrical generator under reduced load, may operate more efficiently with a fuel mix different from that required for rapid acceleration under heavy torque requirements or during startup in a low-temperature environment. Various fuel mix requirements can be programmed into the computer and stored in the computer's non-volatile memory in order to maintain the desired configuration when the engine is turned off. In a preferred embodiment the programming of the computer is accomplished transparently by simple operator adjustments on the engine control panel, so that the operator has no need to even know that a computer is operating the system. Rather, the computer's program may be modified in real time by the machine itself, based on transient power demands and on the movement and positions of dials and switches on the engine control panel, which are similar in all essential respects to the controls an operator may be accustomed to in other machine environments.

In one exemplary embodiment, the engine will be of a "diesel" type set up to run on diesel fuel and/or vegetable oil, separately or in combination, along with one or more gaseous fuels such as propane and/or hydrogen. In such an embodiment the hydrogen may be either supplied from high-compression tanks or generated on-site while the engine is running. A possible configuration of such an embodiment could include: a tank to contain the petroleum diesel fuel; a tank to contain the vegetable oil or other bio-diesel fuel, each with an associated fuel pump to feed the fuel into the system at an appropriate rate and pressure; a tank to contain the propane fuel; a tank or other system to contain or generate gaseous hydrogen or a hydrogen/oxygen mix; a pressure regulator to regulate the outflow from the propane tank; a sensor to read the temperature of the gaseous propane as it flows from the propane tank; a flow-control valve with associated flow sensor to control the amount of propane entering the system; a positive displacement pump to raise the pressure of the gaseous propane to a level at which the propane returns to liquid form ready to be introduced into the fuel mix at a controlled rate, a fuel circulation conduit; a circulation pump to keep the fuel mixture in a homogenous state while awaiting transfer into the injection pump plungers for injection into the combustion chambers; an accumulator to hold and stabilize excess surges of fuel; a microprocessor control system, including non-volatile memory, programmed to read all of the sensors and to respond appropriately with control signals to all of the active component parts, including the pumps and control valves; and tubing, hoses and fittings to contain and direct the various types and mixtures of fuel. It is assumed that in such a configuration the fuel mixture may be fed into a common rail injector system, in which an injector pump, as commonly used in the prior art, will provide the high pressure to inject the fuel mixture into the combustion chambers.

Other exemplary embodiments may simplify the above arrangement by omitting one or more fuel tanks and various sensors, valves and pumps. In such an alternative embodiment, the pressure of the propane or hydrogen, as set by the regulator at the tank may be used to control the amount and rate of flow of the liquid fuel.

The hydrogen may be supplied from a high pressure reserve tank or be generated on-site by electrolysis of a water solution or by other means now known or later developed. If the hydrogen is generated on-site from a water solution, the oxygen component may be injected together with the hydrogen into the fuel mix or directed separately into the intake airflow.

Persons skilled in the art will recognize various possibilities for combining different components as described herein to meet the differing requirements of particular situations, whether stationary or in moving vehicles.

The multi-fuel co-injection system and method of the present invention is generally designed to improve the power of various engines, turbines and the like, which power may be extracted from a variety of different fuel types now known or later developed. Depending on the particular chemical composition of a type of fuel, the combination with another fuel type may substantially improve the combustion characteristics so that the two fuels mixed together generate power more efficiently than the fuels burned separately. Thus, the system may substantially reduce the operating costs by enhancing the burn characteristics of a less expensive fuel through addition of a small proportion of a more expensive fuel having a different chemical composition or combustion characteristic.

As will be appreciated by those skilled in the art, a system according to the present invention may be constructed with various degrees of complexity depending on the particular use to which the power system is to be applied. In general, the more complex the system, the greater efficiencies may be achieved. However, some situations, such as installation in a motor vehicle, may require considerable simplification. Appropriate design of such a simplified system as disclosed herein still provides considerable advantages in efficiency of fuel consumption over the prior art.

In order to achieve still further operating efficiency, a relatively more complex embodiment such as that shown in FIG. 1 may be employed. This system may be a diesel type internal combustion engine with a multi-fuel supply which consists in part of a tank 10 containing petroleum diesel fuel, a tank 11 containing a bio-diesel fuel such as vegetable oil, a tank 12 containing propane, and a tank or other supply source 13 providing hydrogen either from a compressed tank or from a hydrox generator as described further below.

A low-pressure fuel pump 14 is connected to tank 10 by means of a tube 15. Another tube 16 connects pump 14 to a combination pressure/flow sensor and control valve 17, which interacts by means of an electrical connection 18 with a micro-processor control unit 19, which receives data from the sensor 17 and returns a control signal to determine the amount and rate of fuel flowing in tube 56 to the manifold 20 where it is combined with the bio diesel fuel from tank 11.

A second tank 11 may contain bio-diesel or vegetable oil or other liquid fuel now known or later developed. A low-pressure pump 21 is connected to tank 11 by means of a tube 22. Another tube 23 connects to a combination pressure/flow sensor and control valve 24, which interacts by means of an electrical connection 25 with the micro-processor control unit 19 which receives data from the sensor 24 and returns a control signal to determine the amount and rate of fuel to be flowing in tube 57 to the manifold 20 where the bio-fuel is combined with the fuel from the other sources.

A third tank 12 may contain propane, or other gaseous fuel such as natural gas or generated methane. A tube 26 connects the tank 12 to a pressure regulator 27 and controls the pressure of the gaseous fuel released from tank 12 into the low-pressure part of the system. A tube 28 connects the pressure regulator to a combination sensor and control valve 29 which interacts by means of an electrical connection 30 to the microprocessor control unit 19, which receives data from the sensor 29 and returns a control signal to determine the amount and rate of gaseous fuel to be forwarded to an optional positive displacement pump 31 that raises the pressure of the gaseous fuel to a level appropriate to permit positive mixing with the liquid fuel. A further combination sensor and control valve 32 interacts with the microprocessor control unit 19 in the manner already described and forwards the re-pressurized gaseous fuel to the manifold 20 via tube 33 where the gaseous fuel is combined with the fuel from the other sources in the system.

A fourth tank 13 may contain hydrogen under high pressure. A tube 34 connects the tank 13 to a pressure regulator 35 and controls the pressure of the hydrogen released from tank 13 into the low-pressure part of the system. A tube 36 connects the pressure regulator 35 to a combination sensor and control valve 37 which interacts by means of an electrical connection 38 to the microprocessor control unit 19, which receives data from the sensor 37 and returns a control signal in the manner already described to forward the hydrogen by means of tube 58 to a positive displacement pump 39, where the pressure of the hydrogen is raised to a level appropriate to mix well with the fuel from other sources in the system. Another combination sensor and control valve 40 interacts with the microprocessor control unit 19 via an electrical contact 41 in the manner already described, from where the re-pressurized hydrogen is conducted by means of tube 42 to the manifold 20 where it is combined with the fuel from the other sources in the system.

In an alternative embodiment, tank 13 may be replaced by a hydrogen generator as shown and described in connection with FIG. 4. In such a case the pressure regulator 35 and the combination sensor and control valve 37 would be omitted and the hydrogen, as generated in the generator 13 represented in FIG. 4, would flow in tube 34 directly to the positive displacement pump 39 to be mixed into the system as described above.

While exemplary components are shown and described as including one or more tanks, pumps, control valves, sensors, and the like, those skilled in the art will appreciate that the use of such components, alone or in any combination, is merely illustrative and that the invention is not so limited. Rather, any such components now known or later developed for the purpose of storing, transferring, controlling and measuring or monitoring one or more fuels within such a fuel delivery system are possible without departing from the spirit and scope of the invention.

With continued reference to FIG. 1, after the fuels from the various sources are combined in the manifold 20, the mixture is conducted by means of tube 43 to a high pressure positive displacement pump 44 where the pressure of the fuel is brought up to a level appropriate for the particular fuel mix. The pressure in the circulation loop is sensed and regulated by the high pressure combination flow sensor and control valve 45 in interaction via the electrical connection 46 with the micro-processor control unit 19 in the manner as already described. The high pressure fuel mixture is then circulated in the fuel circulation line 47 by action of a circulation pump 48, the pressure of which is regulated by the high pressure positive displacement pump 44 so that the fuel mixture is not allowed to separate into its component parts. An accumulator 49, as more fully described below in connection with FIG. 3, acts as a reserve supply and pressure holding reservoir to provide instantaneous fuel reserves in case of a surge in fuel requirements resulting from a sudden power demand. A feedback line 50 is provided for blow by of fuel to be returned from the accumulator 49 back to the low side of the high pressure positive displacement pump 44 for re-mixing into the circulating fuel supply.

The injector pump 51 is fed fuel from the circulation loop 47 as required for the engine's operation and injects the fuel mix into the combustion chambers 52 at high pressure through the injectors 55 in the manner as is well known in the art.

Additional tanks, containing other types of fuel, may be added to this system and controlled in a manner essentially as described above.

Figure 2:
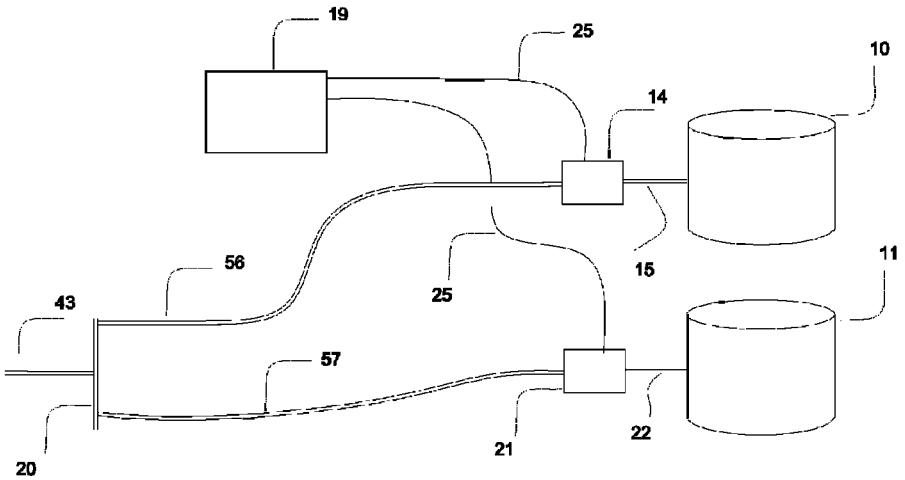
FIG. 2 is a partial schematic view of an alternative exemplary embodiment such as might be installed in a vehicle for co-injecting two fuels.

Turning now to FIG. 2, there is shown an alternative exemplary embodiment of the fuel delivery system of the present invention that is relatively simplified such as might be appropriate for installation in a motor vehicle. This system may be of a diesel type internal combustion engine as installed, for example, in a motor vehicle, with a multi-fuel supply that consists in part of a tank 10 containing petroleum diesel fuel or vegetable oil or other bio-diesel fuel and a tank 11 containing propane or some other gaseous fuel. In some embodiments this alternate fuel may be hydrogen from a high pressure supply tank or from a hydrogen generator, such as described in connection with FIG. 4.

A low-pressure fuel pump 14 is connected to tank 10 by means of a tube 15. The output of this pump 14 is controlled by the microprocessor control unit 19 by means of an electrical connection 25 in response to signals received by the microprocessor control unit 19 from other parts of the system as described below. A tube 56 conducts the liquid fuel to the manifold 20 at a pressure established by the low pressure pump 14 under the control of the microprocessor control unit 19.

A pressure regulator 21 is connected to tank 11 by means of tube 22. The flow and pressure of the gaseous fuel is controlled by the pressure regulator 21 in response to signals from the microprocessor control unit 19, according to data received and processed from other parts of the system.

The liquid and gaseous fuels flow to the manifold 20 at rates and pressures, controlled by the microprocessor control unit 19, appropriate for effective mixing based on the properties of the respective fuels. The pressure of the gaseous fuel as it flows to the manifold 20 provides an effective control factor for the amount of liquid fuel entering the system.

The remainder of the simplified system with components related to the high pressure positive displacement pump and the fuel circulation line are essentially similar to the description given in reference to FIG. 1.

Figure 3:
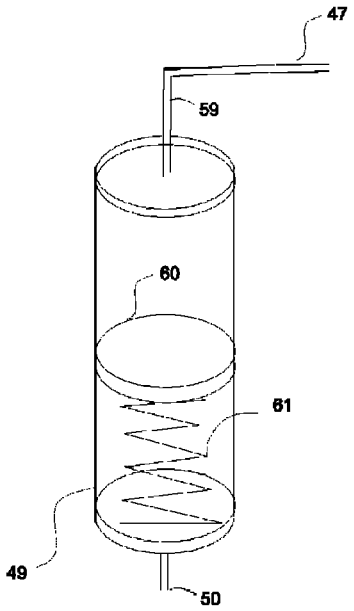
FIG. 3 is a partial schematic view of an exemplary accumulator located in the fuel circulation system of FIG. 1.

Referring now to FIG. 3, there is illustrated an exemplary accumulator 49 as attached to the fuel circulation line 47 shown in FIG. 1 and providing for return of fuel blow by via feedback line 50 to the low side of the high pressure positive displacement pump 44 for re-mixing into the circulating fuel supply as also shown in FIG. 1. The accumulator 49 thus generally consists of a cylinder closed at both ends, a connector 59 connecting the high pressure side of the accumulator to the high pressure fuel circulation line 47, and another tube 50 connecting the low pressure side of the accumulator to the tube 43 and the low pressure side of the high pressure positive displacement pump 44. A sealed piston 60 separates the high pressure and low pressure sides of the accumulator 49. A spring 61 in the low pressure side of the accumulator presses against the piston 60 and sustains the piston against the pressure exerted by the fuel circulation line 47. The blow by hose 50 conducts fuel back to the low pressure side of the high pressure positive displacement pump 44.

Figure 4:
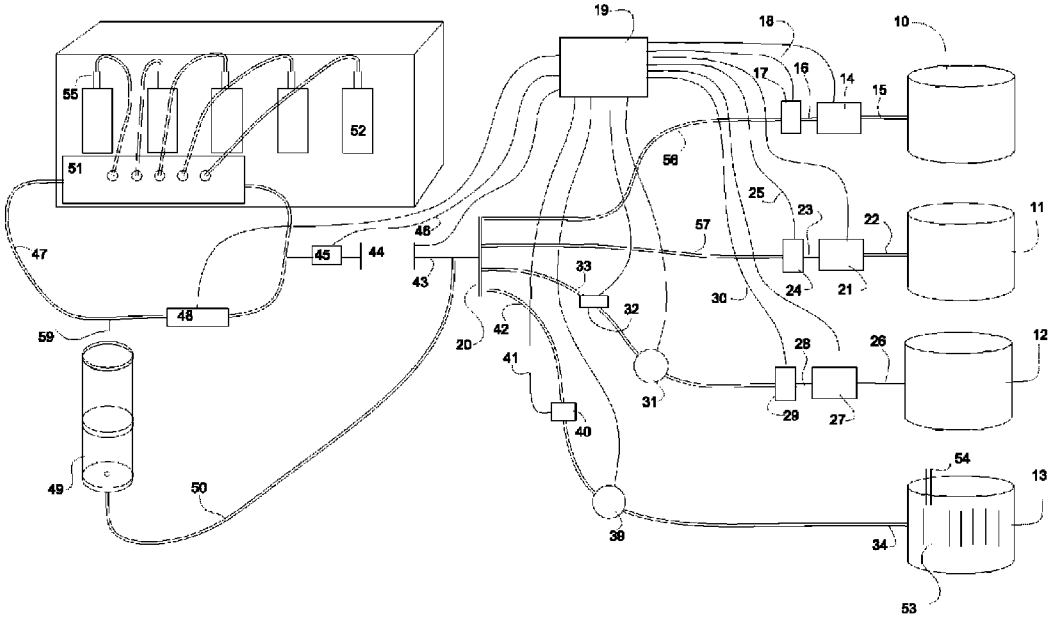
FIG. 4 is a schematic view of an alternative exemplary embodiment of the invention including such as may be used in a variety of installations.
Figure 5:
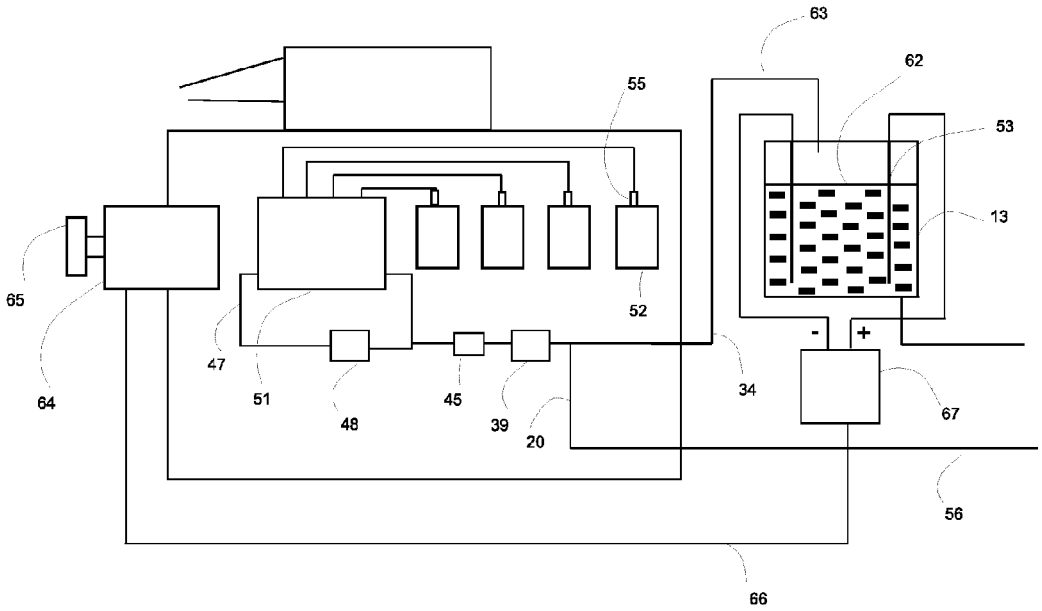
FIG. 5 is a partial schematic view of an exemplary hydrogen generating system located in the fuel supply system of FIG. 4.

Turning to FIG. 5, there is shown a partial schematic view of the hydrogen generator generally denoted 13 in FIG. 4, which may provide a source of hydrogen to the system other than by a high pressure hydrogen supply tank. A grid 53 consisting of two or more screens or perforated plates insulated from each other and connected alternately to positive and negative poles of a DC current supply 67 is immersed in an aqueous solution 62 in the tank 13 which is closed at the top with provision for transport means 63 for the oxygen and hydrogen produced by electrolysis. In such an exemplary embodiment the oxygen and hydrogen from the electrolysis may be directed into the positive displacement pump 39 to be further processed as described in FIG. 4

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A system for multi-fuel injection within an engine from at least two fuel supplies, the engine having an injector including an injector pump, the improvement comprising:

a manifold in fluid communication with and downstream of the at least two fuel supplies wherein fuels from the at least two fuel supplies are mixed to produce a fuel mixture as controlled by a [combination] flow sensor and *a* control valve located in-line between each fuel supply and the manifold; and a high-pressure positive displacement pump in fluid communication with and downstream of the manifold and in-line between the manifold and the engine, whereby the fuel mixture is brought to higher pressure before being injected by the injector; wherein:

a first fuel is in a liquid state as supplied by a first fuel supply and delivered to the manifold; and a second fuel is in a gaseous state as supplied by a second fuel supply and delivered to the manifold, whereby the fuel mixture is a liquid-gaseous fuel mixture and the positive displacement pump pressurizes the liquid-gaseous fuel mixture prior to injection.

2. A system for multi-fuel injection within an engine from at least two fuel supplies, the engine having an injector including an injector pump, the improvement comprising:

a manifold in fluid communication with and downstream of the at least two fuel supplies wherein fuels from the at least two fuel supplies are mixed to produce a fuel mixture as controlled by a [combination] flow sensor and *a* control valve located in-line between each fuel supply and the manifold; and a high-pressure positive displacement pump in fluid communication with and downstream of the manifold and in-line between the manifold and the engine, whereby the fuel mixture is brought to higher pressure before being injected by the injector, the improvement further comprising a circulation loop connected between the positive displacement pump and the injector pump of the engine, the circulation loop including a circulation line and a circulation pump substantially constantly circulating the fuel mixture and delivering the fuel mixture to an inlet of the injector pump.

3. The system of claim 2, wherein the circulation loop further includes an accumulator within the circulation line, whereby pressure and fuel requirement surges are substantially absorbed by the accumulator.

4. The system of claim 3, wherein the circulation loop further includes a feedback line leading from a side of the accumulator substantially opposite the circulation line back to the inlet of the positive-displacement pump, whereby blow by fuel mixture is reclaimed and returned to the inlet of the positive displacement pump for further processing.

5. A system for multi-fuel injection within an engine from at least two fuel supplies from which a fuel mixture is prepared, the engine having an injector including an injector pump, the improvement comprising:

a circulation loop in fluid communication with the at least two fuel supplies and including a circulation line and a circulation pump substantially constantly circulating the fuel mixture and delivering the fuel mixture to the injector pump of the engine, whereby homogeneity of the fuel mixture is substantially maintained prior to injection;

an accumulator within the circulation line, whereby pressure and fuel requirement surges are substantially absorbed by the accumulator; and a feedback line leading from a side of the accumulator substantially opposite the circulation line back to a high-pressure positive displacement pump, whereby blow by fuel mixture is reclaimed and returned to the positive displacement pump for further processing.

6. A system for multi-fuel injection with an engine from at least two fuel supplies, the engine having an injector including an injector pump, the improvement comprising:

a manifold in fluid communication with and downstream of the at least two fuel supplies wherein fuels from the at least two fuel supplies are mixed to produce a fuel mixture as controlled by a [combination] flow sensor and *a* control valve located in-line between each fuel supply and the manifold;

a high-pressure positive displacement pump in fluid communication with and downstream of the manifold and in-line between the manifold and the engine, whereby the fuel mixture is brought to higher pressure before being injected by the injector; and a circulation loop connected between the positive displacement pump and the injector pump of the engine, the circulation loop including a circulation line and a circulation pump substantially constantly circulating the fuel mixture and delivering the fuel mixture to an inlet of the injector pump, whereby homogeneity of the fuel mixture is substantially maintained downstream of the positive displacement pump.

*7. A multi-fuel co-injection system comprising:*

*a positive displacement pump configured to pressurize a fuel mixture, the fuel mixture comprising a liquid first fuel and a gaseous second fuel; and*

*a circulation line defining a loop in fluid communication with the positive displacement pump and configured to circulate the fuel mixture as pressurized by the positive displacement pump.*

*8. The system of claim 7, further comprising:*

*a first tube for flowing the first fuel;*

*a second tube for flowing the second fuel; and*

*a manifold in fluid communication with the first and second tubes and configured for combining the first and second fuels to produce the fuel mixture.*

*9. The system of claim 8, further comprising a third tube for flowing a third fuel, the third tube being in fluid communication with the manifold.*

*10. The system of claim 9, further comprising a fourth tube for flowing a fourth fuel, the fourth tube being in fluid communication with the manifold, the third and fourth fuels being different from each other and from the first and second fuels.*

*11. The system of claim 7, wherein the first fuel is selected from the group consisting of diesel, bio-diesel, motor oil, and vegetable oil and the second fuel is selected from the group consisting of hydrogen, oxygen, hydrox, propane, natural gas and methane.*

*12. The system of claim 7, wherein the second fuel is sourced from a hydrogen generator.*

*13. The system of claim 7, further comprising an accumulator in fluid communication with the circulation line and configured to stabilize fuel requirement surges within the system.*

*14. The system of claim 7, wherein:*

*the accumulator is coupled to the circulation line; and*

*a feedback line is coupled from a side of the accumulator substantially opposite the circulation line back to the positive displacement pump, whereby blow by fuel mixture is reclaimed and returned to the positive displacement pump for further processing.*

*15. The system of claim 7, further comprising a control system wherein:*

*a first control valve is in fluid communication with the first tube;*

*a second control valve is in fluid communication with the second tube; and*

*a microprocessor control unit is electrically connected to the first and second control valves so as to control the supply of the first and second fuels to the manifold.*

*16. The system of claim 15, wherein:*

*a first flow sensor is associated with the first control valve so as to also be in fluid communication with the first tube and so define a first combination sensor and control valve;*

*a second flow sensor is associated with the second control valve so as to also be in fluid communication with the second tube and so define a second combination sensor and control valve; and*

*the microprocessor control unit is electrically connected to the first and second flow sensors so as to account for the flow of the first and second fuels in the first and second tubes as provided by the first and second flow sensors in thereby controlling the first and second control valves and thus the supply of the first and second fuels to the manifold.*

*17. The system of claim 7, further comprising a control system wherein:*

*a combination flow sensor and control valve is in fluid communication with the positive displacement pump; and*

*a microprocessor control unit is electrically connected to the combination flow sensor and control valve and to the positive displacement pump so as to regulate and maintain the pressurization of the fuel mixture by the positive displacement pump.*

*18. A method for multi-fuel injection comprising the steps of:*

*repressurizing a fuel mixture comprised of a liquid first fuel and a gaseous second fuel;*

*circulating the pressurized fuel mixture; and*

*delivering the pressurized, circulated fuel mixture to an injector pump of an engine.*

*19. The method of claim 18, further comprising the step of supplying the second fuel from a hydrogen generator.*

*20. The method of claim 18, further comprising the steps of:*

*supplying the first and second fuels from respective first and second fuel sources;*

*detecting the flow of the first and second fuels; and*

*controlling the flow of the first and second fuels using control valves under the control of a microprocessor control unit electrically connected to the control valves.*

*21. The method of claim 18, wherein the step of pressurizing the fuel mixture comprises the further steps of:*

*detecting the flow of fuel mixture through the positive displacement pump using a flow sensor; and*

*regulating the positive displacement pump using a microprocessor control unit electrically connected to the flow sensor and to the positive displacement pump so as to maintain the pressurization of the fuel mixture by the positive displacement pump.*

* * * * *

UNITED STATES PATENT AND TRADEMARK OFFICE

CERTIFICATE OF CORRECTION

PATENT NO. : RE45,413 E
APPLICATION NO. : 13/732563
DATED : March 17, 2015
INVENTOR(S) : Morten A. Lund It is certified that error appears in the above-identified patent and that said Letters Patent is hereby corrected as shown below:

In the Claims

In column 12, claim 18, line 28, please delete “repressurizing” and insert --pressurizing--.

Signed and Sealed this
Thirtieth Day of June, 2015

Michelle K. Lee

Michelle K. Lee
*Director of the United States Patent and Trademark Office*